US012738985B2

(12) United States Patent
Taniguchi et al.

(10) Patent No.: US 12,738,985 B2
(45) Date of Patent: Sep. 15, 2026

(54) RADIO WAVE PROPAGATION ENVIRONMENT REPRODUCTION SYSTEM AND RADIO WAVE PROPAGATION ENVIRONMENT REPRODUCTION METHOD

(71) Applicant: NTT, Inc., Tokyo (JP)

(72) Inventors: Ryotaro Taniguchi, Musashino (JP); Tomoki Murakami, Musashino (JP); Tomoaki Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 332 days.

(21) Appl. No.: 18/706,114

(22) PCT Filed: Nov. 1, 2021

(86) PCT No.: PCT/JP2021/040284
§ 371 (c)(1),
(2) Date: Apr. 30, 2024

(87) PCT Pub. No.: WO2023/073995
PCT Pub. Date: May 4, 2023

(65) Prior Publication Data

US 2026/0113075 A1 Apr. 23, 2026

(51) Int. Cl.
*H04B 7/04* (2017.01)
*H04B 7/06* (2006.01)
*H04B 7/08* (2006.01)

(52) U.S. Cl.
CPC ....... *H04B 7/04013* (2023.05); *H04B 7/0623* (2013.01); *H04B 7/086* (2013.01)

(58) Field of Classification Search
CPC .. H04B 7/04013; H04B 7/0623; H04B 7/086; H04B 17/10; H04B 17/309; H04B 17/391; H04B 17/3912; H04B 7/0617; G01R 29/0821; G01R 29/105; H04W 16/26; H04W 16/28
See application file for complete search history.

(56) References Cited

U.S. PATENT DOCUMENTS 10,725,079 B2 * 7/2020 Kvarnstrand ...... G01R 29/0821

OTHER PUBLICATIONS

W. Kotterman, M. Landmann and R. Thomä, "Projection-OTA, Over-the-Air Testing by Reconfigurable Reflecting Structures," 2021 15th European Conference on Antennas and Propagation (EuCAP), Dusseldorf, Germany, 2021, pp. 1-5, doi: 10.23919/EuCAP51087.2021.9411326. (Year: 2021).*

(Continued)

*Primary Examiner* — Vladimir Magloire
*Assistant Examiner* — Naomi M Wolford
(74) *Attorney, Agent, or Firm* — XSENSUS LLP

(57) ABSTRACT

A radio wave propagation environment reproduction system according to an embodiment includes: a transmitter to transmit radio waves in a predetermined direction in a reverberation chamber; a reflection angle change RIS to reflect the radio waves transmitted; an installation angle controller to control an installation angle of the reflection angle change RIS; a reflection angle controller to control a reflection angle of the radio waves; a direction-of-arrival estimator to estimate a direction of arrival of the radio waves reflected; and a control server to control the installation angle controller and the reflection angle controller on the basis of the direction of arrival of the radio waves estimated.

6 Claims, 14 Drawing Sheets

(56) References Cited

OTHER PUBLICATIONS

Jing et al., "MIMO OTA Test for a Mobile Station Performance Evaluation", IEEE Instrumentation & Measurement Magazine, vol. 19, Issue 3, Jun. 2016, pp. 43-50.
Zheng et al., "Intelligent Reflecting Surface-Enhanced OFDM: Channel Estimation and Reflection Optimization", IEEE Wireless Communications Letters, vol. 9, Issue 4, Dec. 20, 2019, 9 pages.
Yamaguchi et al., "Virtual Array Antenna Techniques for Antenna and Propagation Measurements on Mobile Communications", IEICE Transactions B, vol. J102-B, No. 11, Jun. 25, 2019, 38 pages including English Translation.

* cited by examiner $z_{Tx}$ : HEIGHT OF TRANSMITTING ANTENNA

Fig. 10

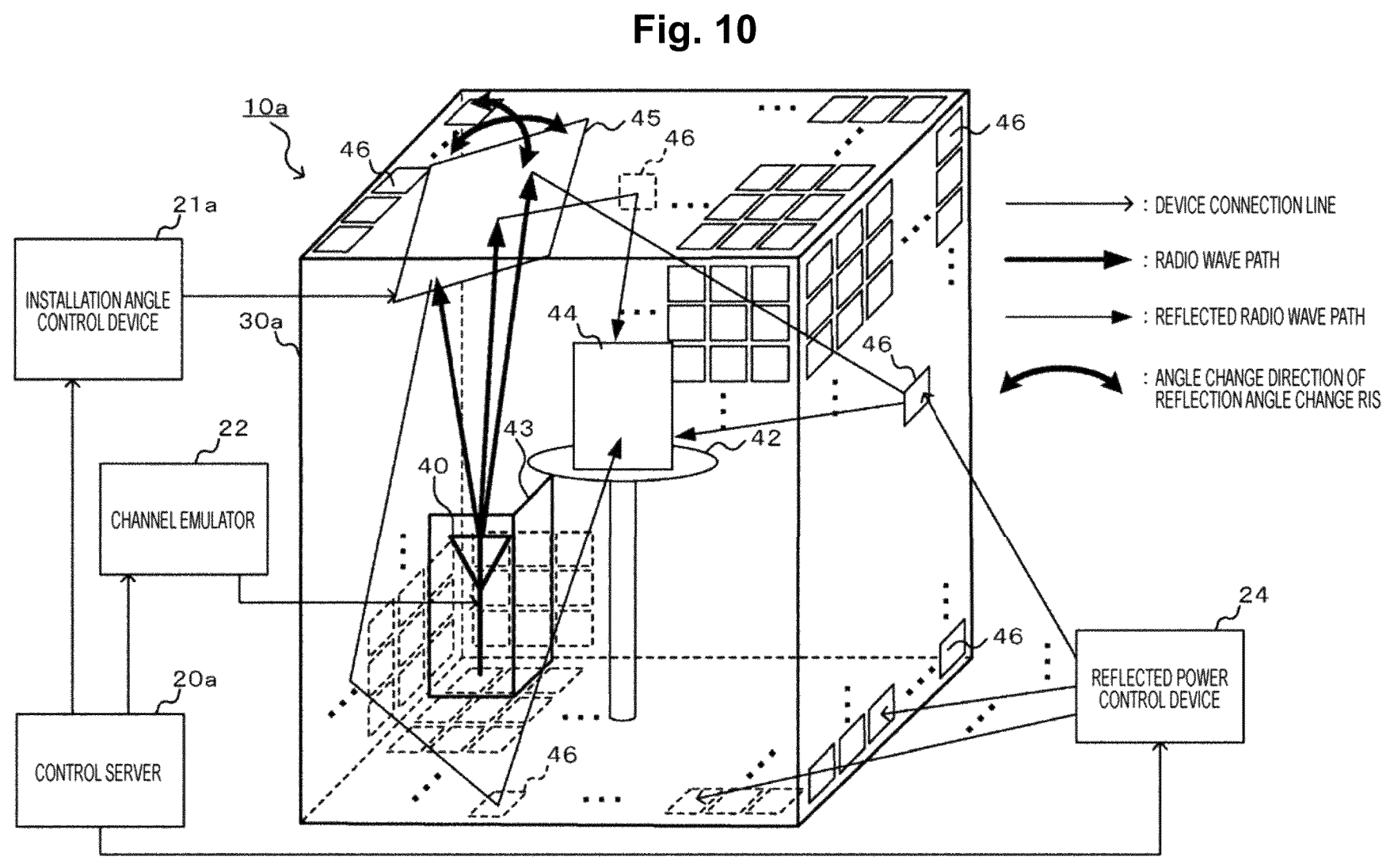

: DEVICE CONNECTION LINE

: RADIO WAVE PATH

: REFLECTED RADIO WAVE PATH

: ANGLE CHANGE DIRECTION OF REFLECTION ANGLE CHANGE RIS

10a

21a INSTALLATION ANGLE CONTROL DEVICE

22 CHANNEL EMULATOR

20a CONTROL SERVER

24 REFLECTED POWER CONTROL DEVICE

1a
14
140
140
140
141
142
142
143
MEASUREMENT OBJECT
CHANNEL EMULATOR
12
CONTROL SERVER
11
RIS CONTROL DEVICE
13

RADIO WAVE PROPAGATION ENVIRONMENT REPRODUCTION SYSTEM AND RADIO WAVE PROPAGATION ENVIRONMENT REPRODUCTION METHOD

CROSS-REFERENCE TO RELATED APPLICATION

The present application is a national stage application, pursuant to 35 U.S.C. § 371, of International Patent Application No. PCT/JP2021/040284, filed on Nov. 1, 2021, the contents of which are incorporated herein by reference in their entirety.

TECHNICAL FIELD

The present invention relates to a radio wave propagation environment reproduction system and a radio wave propagation environment reproduction method.

BACKGROUND ART

When an attempt is made to evaluate communication of a wireless terminal using a frequency of a millimeter wave band or more used in a fifth-generation mobile communication system (5G) or the like by wire, the configuration is complicated or structurally impossible in many cases.

Therefore, an attempt (OTA test: over the air test) of wirelessly transmitting and receiving a high-frequency signal and easily evaluating a target device at high speed has been made.

For example, there is a technique called a reverberation chamber-based method with or without a channel emulator (RC and RC+CE) in which a stirrer (a plate that scatters radio waves) is disposed in a reverberation chamber (a room surrounded by a metal plate) to emulate a statistically isotropic multipath environment.

In addition, there are a method of installing a large number of antennas and reconfigurable intelligent surfaces (RISs: reflectors that arbitrarily control reflection characteristics of radio waves) in a reverberation chamber, determining parameters by simulation and machine learning, and reproducing an arbitrary radio wave propagation environment, a multi probe anechoic chamber (MPAC) method, and the like (see, for example, Non Patent Literature 1).

CITATION LIST

Non Patent Literature

Non Patent Literature 1: Ya Jing, Hongwei Kong, Moray Rumney, "MIMO OTA test for a mobile station performance evaluation", IEEE Instrumentation & Measurement Magazine, Volume: 19, Issue: 3, June 2016, pp. 43-50

SUMMARY OF INVENTION

Technical Problem

For example, in a case where a stirrer is disposed in a reverberation chamber to emulate a statistically isotropic multipath environment, only isotropic three-dimensional distribution propagation channels can be generated. Also, the propagation channel that can be reproduced is determined by the shape of the stirrer and the size of the reverberation chamber. Therefore, the propagation channel that can be reproduced using the same stirrer is limited, and it is necessary to change the stirrer to another one in order to reproduce another propagation channel.

In addition, in a case where a large number of antennas and RISs are installed in a reverberation chamber and parameters are determined by simulation and machine learning, advanced expertise and high-performance computers and software are required.

The present invention has been made in view of the above-described problems, and an object of the present invention is to provide a radio wave propagation environment reproduction system and a radio wave propagation environment reproduction method capable of facilitating reproduction of a complicated propagation environment of radio waves.

Solution to Problem

A radio wave propagation environment reproduction system according to an embodiment of the present invention includes: a transmission device that transmits radio waves in a predetermined direction in a reverberation chamber; a reflection angle change RIS that reflects the radio waves transmitted by the transmission device at an angle according to a control signal; an installation angle control device that controls an installation angle of the reflection angle change RIS by outputting a control signal to the reflection angle change RIS; a reflection angle control device that controls a reflection angle of the radio waves by the reflection angle change RIS by outputting a control signal to the reflection angle change RIS; a direction-of-arrival estimation device that estimates a direction of arrival of the radio waves reflected by the reflection angle change RIS at a predetermined position in the reverberation chamber; and a control server that controls the installation angle control device and the reflection angle control device on the basis of the direction of arrival of the radio waves estimated by the direction-of-arrival estimation device.

A radio wave propagation environment reproduction system according to an embodiment of the present invention includes: a transmission device that transmits radio waves in a predetermined direction in a reverberation chamber; a reflector that reflects the radio waves transmitted by the transmission device; an installation angle control device that controls an installation angle of the reflector by outputting a control signal to the reflector; a reflected power change RIS that changes the radio waves reflected by the reflector to power according to a control signal and reflects the power; a reflected power control device that controls the power of the radio waves reflected by the reflected power change RIS by outputting a control signal to the reflected power change RIS; a direction-of-arrival estimation device that estimates a direction of arrival of the radio waves reflected by the reflected power change RIS at a predetermined position in the reverberation chamber; and a control server that controls the installation angle control device and the reflected power control device on the basis of the direction of arrival of the radio waves estimated by the direction-of-arrival estimation device.

A radio wave propagation environment reproduction method according to an embodiment of the present invention includes: a step of controlling an installation angle of a reflection angle change RIS that reflects radio waves transmitted by a transmission device in a predetermined direction in a reverberation chamber at an angle according to a control signal; a step of controlling a reflection angle of the radio waves reflected by the reflection angle change RIS according to a control signal; a step of estimating a direction of arrival of the radio waves reflected by the reflection angle change RIS at a predetermined position in the reverberation chamber; and a step of controlling the installation angle and the reflection angle of the reflection angle change RIS on the basis of the estimated direction of arrival of the radio waves.

A radio wave propagation environment reproduction method according to an embodiment of the present invention includes: a step of controlling an installation angle of a reflector that reflects radio waves transmitted by a transmission device in a predetermined direction in a reverberation chamber; a step of controlling reflected power of the radio waves reflected by the reflector with respect to a reflected power change RIS that changes power according to a control signal and reflects the power; a step of estimating a direction of arrival of the radio waves reflected by the reflected power change RIS at a predetermined position in the reverberation chamber; and a step of controlling the installation angle of the reflector and the power of the radio waves reflected by the reflected power change RIS on the basis of the estimated direction of arrival of the radio waves.

Advantageous Effects of Invention

According to the present invention, it is possible to facilitate reproduction of a complicated propagation environment of radio waves.

BRIEF DESCRIPTION OF DRAWINGS

FIG. 4(*b*) is a diagram illustrating an actual appearance in a case where the reflection angle change RIS is viewed from the height of the antenna of the transmission device.

FIG. 5(*b*) is a diagram of the transmission device, the radio wave absorbers, and the reflection angle change RIS when viewed in an x direction.

FIG. 7(*b*) is a diagram illustrating a positional relationship between the range of radio waves radiated by the transmission device and the radio wave absorbers and the reflection angle change RIS in the x direction.

FIG. 8(*b*) is a diagram illustrating a half-value angle of radio waves radiated by the transmission device when viewed in the x direction.

FIG. 10 is a diagram illustrating an outline of a configuration of a radio wave propagation environment reproduction system according to a second embodiment.

FIG. 13 is a diagram illustrating a configuration of a radio wave propagation environment reproduction system according to a comparative example.

DESCRIPTION OF EMBODIMENTS

Figure 13:
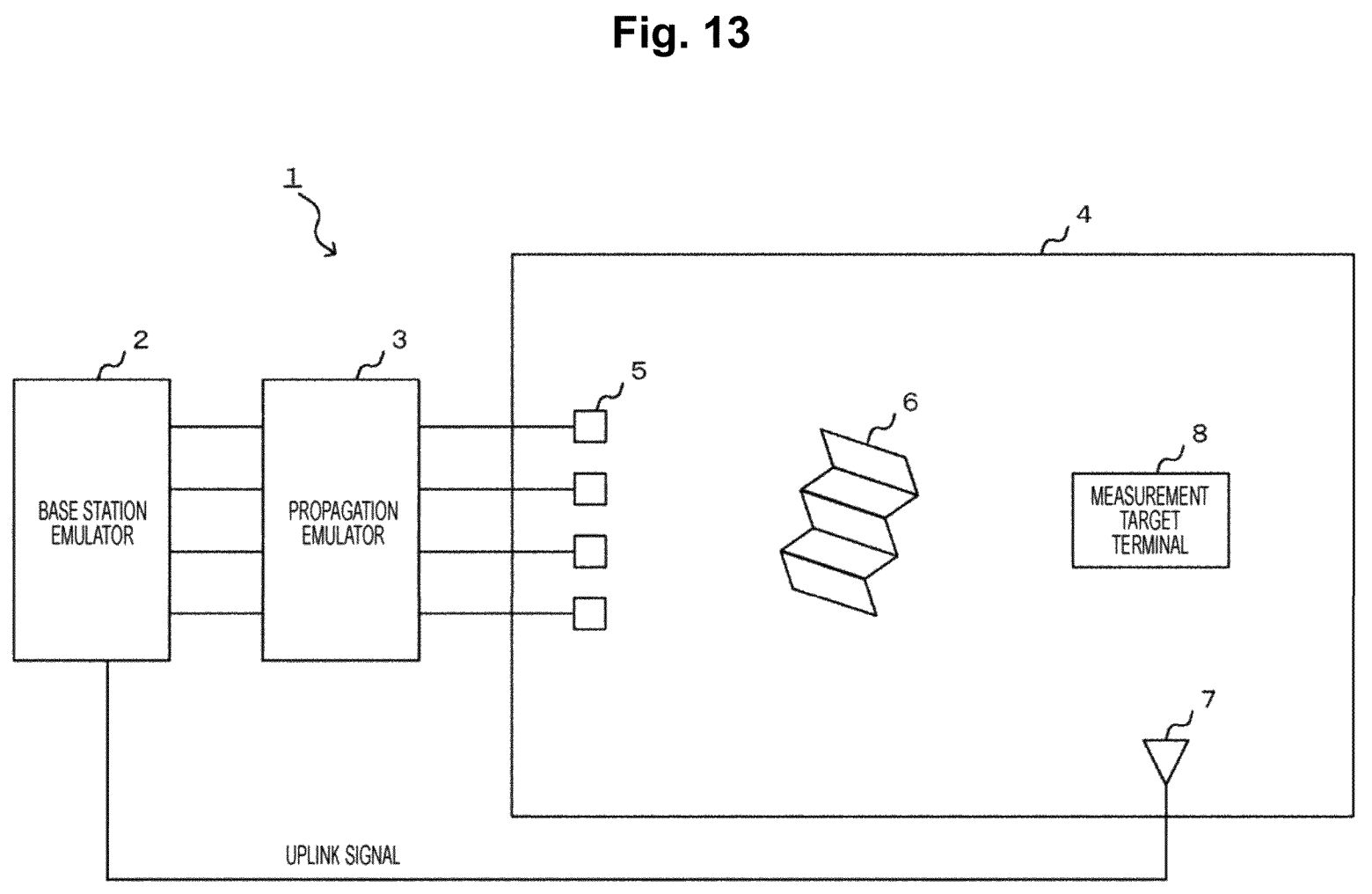
Figure 1:
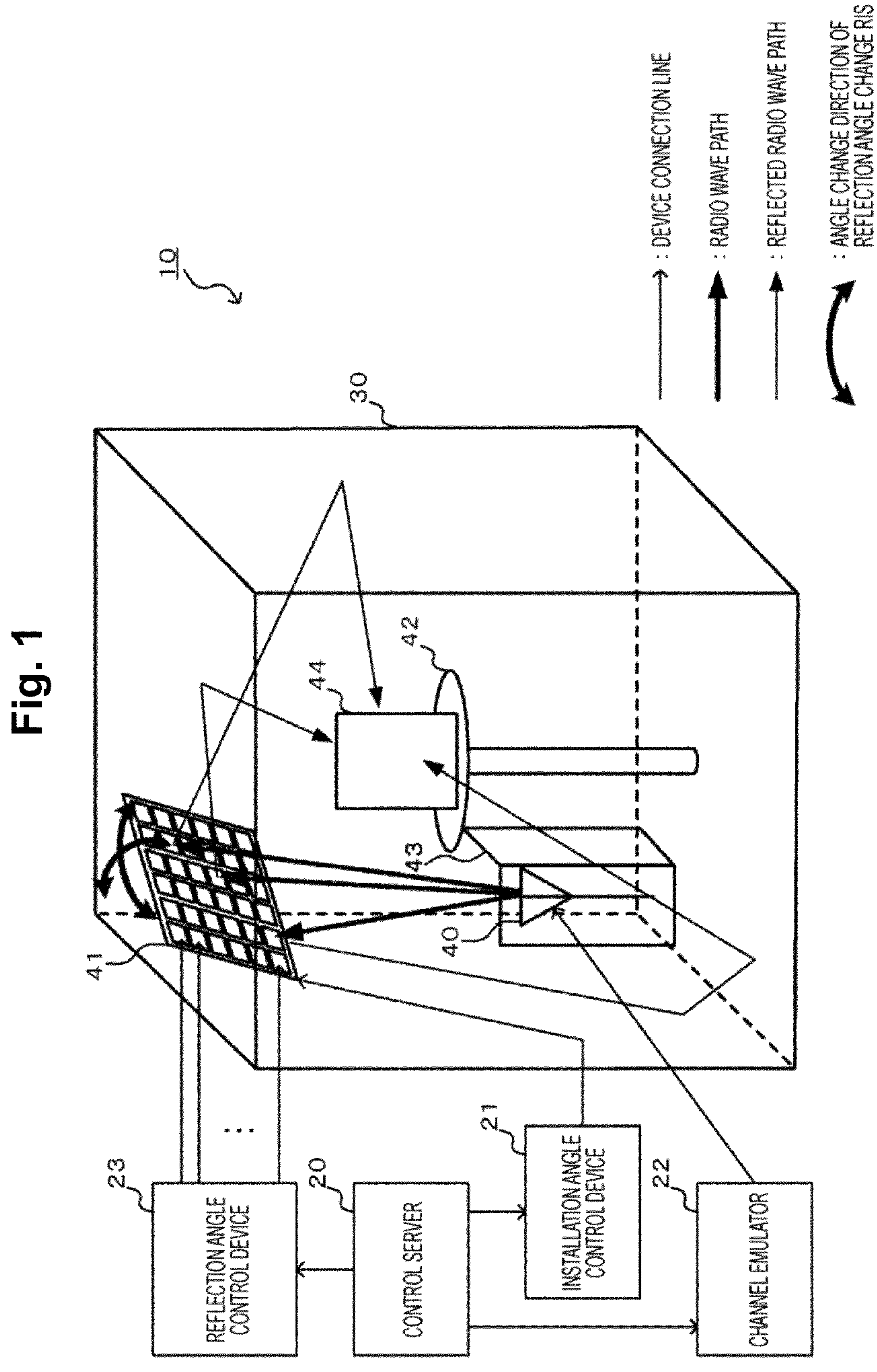
FIG. 1 is a diagram illustrating an outline of a configuration of a radio wave propagation environment reproduction system according to a first embodiment.

First, the background of the present invention will be described. FIG. 13 is a diagram illustrating a configuration of a radio wave propagation environment reproduction system 1 according to a comparative example. As illustrated in FIG. 13, the radio wave propagation environment reproduction system 1 according to the comparative example includes a base station emulator 2, a propagation emulator 3, and a reverberation chamber 4.

In the reverberation chamber 4, a plurality of wall antennas 5, a stirrer 6, and an antenna 7 are provided, and a measurement target terminal 8 is installed. The reverberation chamber 4 forms a space for reverberating radio waves, and the size and the shape of the reverberation chamber 4 can be changed. For example, the reverberation chamber 4 can be formed in a shape such as a rectangular parallelepiped, a sphere, an n-hedron, an n-prism, or an n-pyramid.

The radio wave propagation environment reproduction system 1 can emulate a statistically isotropic multipath environment, but it is necessary to change the shape of the stirrer 6 in order to perform propagation measurement according to various propagation environments.

Figure 14:
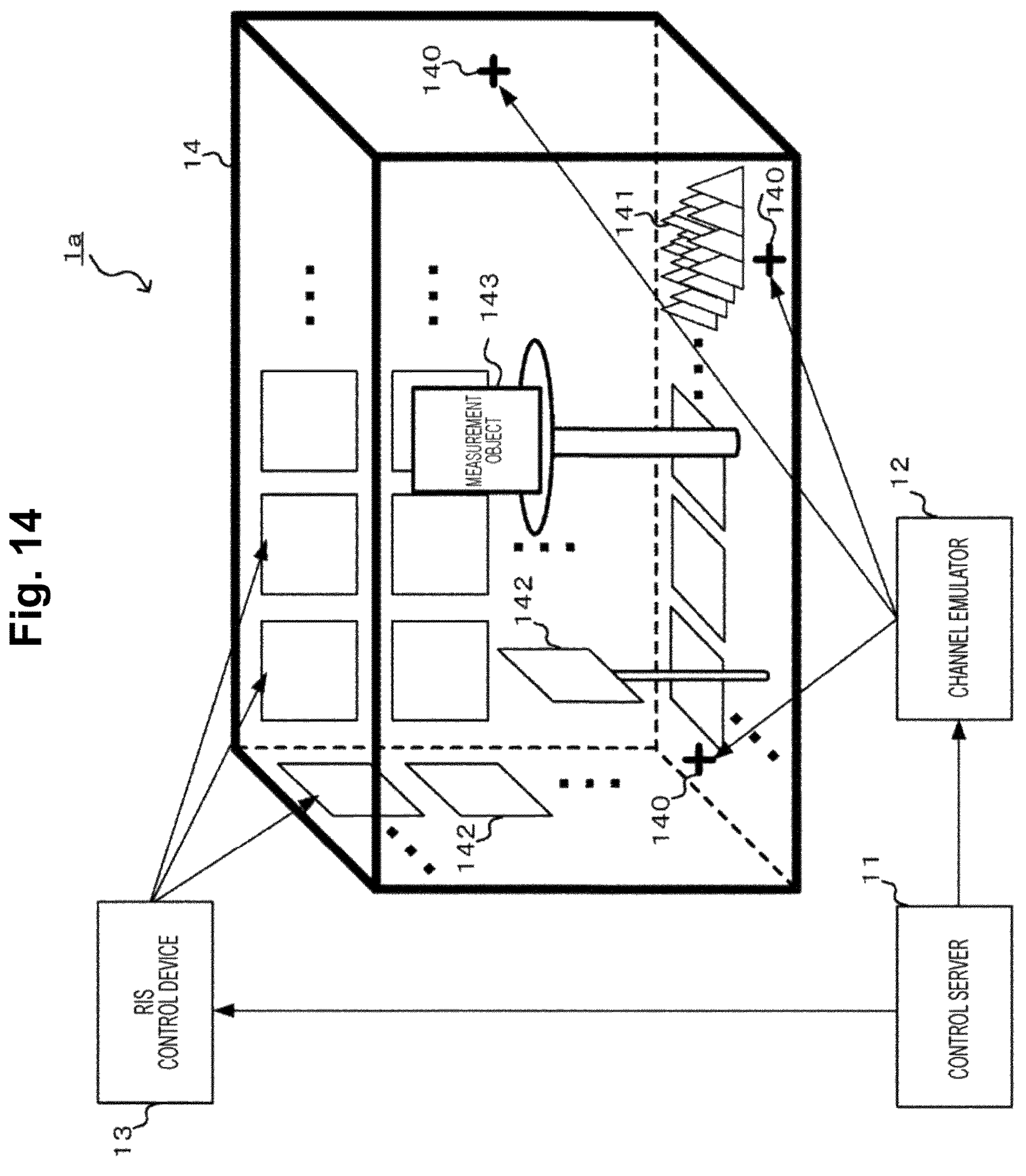
FIG. 14 is a diagram illustrating a configuration of a radio wave propagation environment reproduction system according to another comparative example.

FIG. 14 is a diagram illustrating a configuration of a radio wave propagation environment reproduction system 1*a* according to another comparative example. As illustrated in FIG. 14, the radio wave propagation environment reproduction system 1*a* includes a control server 11, a channel emulator 12, a RIS control device 13, and a reverberation chamber 14.

In the reverberation chamber 14, a plurality of transmitting antennas 140, a radio wave absorber 141, and a plurality of RISs 142 are provided. The plurality of RISs 142 are pasted on the inner wall, the floor, and the ceiling of the reverberation chamber 14, and are also provided in the air in the reverberation chamber 14 using a jig. Then, a terminal serving as a measurement object 143 is installed in the reverberation chamber 14.

In the radio wave propagation environment reproduction system 1*a*, the RIS control device 13 can reproduce the radio wave propagation environment in the reverberation chamber 14 by controlling the reflection direction of each RIS 142, but complicated machine learning is required to control the reflection direction of the RIS 142.

Thus, in the radio wave propagation environment reproduction system of the comparative example, it is necessary to change the stirrer, perform complicated machine learning, and the like, and it is not easy to reproduce a complicated propagation environment of radio waves in some cases. Therefore, a radio wave propagation environment reproduction system according to an embodiment is configured to facilitate reproduction of a complicated propagation environment of radio waves.

Hereinafter, a first embodiment of a radio wave propagation environment reproduction system will be described with reference to the drawings. First, an outline of a radio wave propagation environment reproduction system 10 according to the first embodiment will be described with reference to FIGS. 1 and 2.

Figure 2:
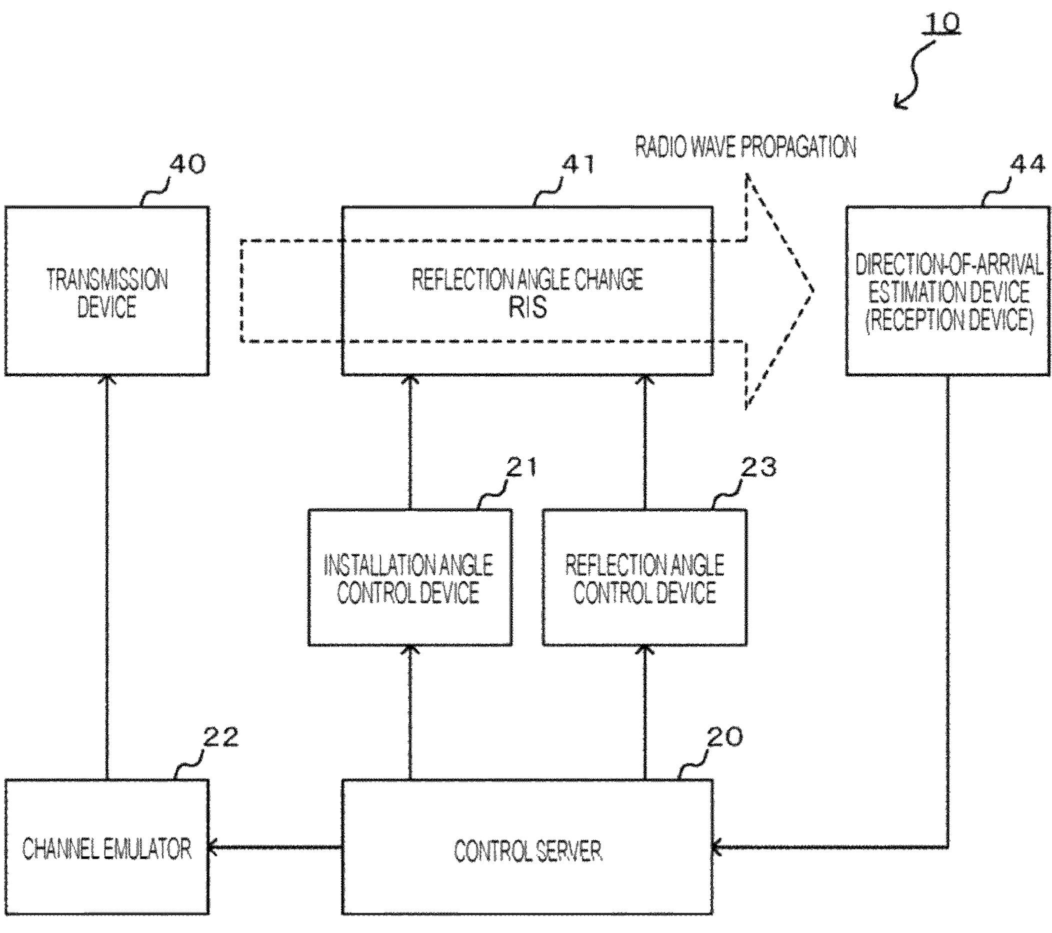
FIG. 2 is a diagram illustrating an outline of functions of the radio wave propagation environment reproduction system according to the first embodiment.

FIG. 1 is a diagram illustrating an outline of a configuration of the radio wave propagation environment reproduction system 10 according to the first embodiment. FIG. 2 is a diagram illustrating an outline of functions of the radio wave propagation environment reproduction system 10 according to the first embodiment.

The radio wave propagation environment reproduction system 10 includes a control server 20, an installation angle control device 21, a channel emulator 22, a reflection angle control device 23, and a reverberation chamber 30.

In the reverberation chamber 30, a transmission device 40, a reflection angle change RIS 41, a placing table 42, a radio wave absorber 43, and a direction-of-arrival estimation device 44 are provided.

The control server 20 has a function as a computer, and controls each unit constituting the radio wave propagation environment reproduction system 10. For example, the control server 20 controls the installation angle control device 21, the channel emulator 22, and the reflection angle control device 23 on the basis of the direction of arrival of the radio waves estimated by the direction-of-arrival estimation device 44 as will be described later.

The installation angle control device 21 controls the installation angle of the reflection angle change RIS 41 by outputting a control signal to the reflection angle change RIS 41.

The channel emulator 22 generates a transmission signal corresponding to a predetermined propagation channel under the control of the control server 20, and outputs the transmission signal to the transmission device 40.

The reflection angle control device 23 controls the reflection angle of the radio waves by the reflection angle change RIS 41 by outputting a control signal to the reflection angle change RIS 41.

The transmission device 40 transmits radio waves in a predetermined direction in the reverberation chamber 30. For example, as will be described later, the transmission device 40 includes an antenna in which a half-value angle indicating directivity matches a line-of-sight range for the reflection angle change RIS 41.

The reflection angle change RIS 41 is a reconfigurable intelligent surface (RIS: a reflector that arbitrarily controls reflection characteristics of radio waves) that reflects the radio waves transmitted by the transmission device 40 at an angle according to the control signal.

The placing table 42 is configured such that the position and the height of the direction-of-arrival estimation device 44 in the reverberation chamber 30 can be changed. Further, a reception device to be measured can be placed on the placing table 42 instead of the direction-of-arrival estimation device 44.

The radio wave absorber 43 absorbs radio waves incident in the reverberation chamber 30. For example, the radio wave absorber 43 creates a non-line-of-sight environment from the environment from the transmission device 40 to the direction-of-arrival estimation device 44. Therefore, since all the radio waves in the reverberation chamber 30 are always reflected by the reflection angle change RIS 41 once, the radio waves are always subjected to the reflection direction control before reaching the direction-of-arrival estimation device 44 (or the reception device to be measured).

The direction-of-arrival estimation device 44 estimates the direction of arrival of the radio waves reflected by the reflection angle change RIS 41 at a predetermined position in the reverberation chamber 30, and outputs the estimation result to the control server 20.

For example, the direction-of-arrival estimation device 44 includes a narrow directional antenna that rotates by a certain angle at an elevation angle and a horizontal angle, and measures radio waves from all directions. Furthermore, the direction-of-arrival estimation device 44 may be configured to include an array antenna (cylindrical array, linear array, square array, etc.) to perform beamforming (MUSIC: Multiple SIgnal Classification, ESPRIT: Estimation of Signal Parameters via Rotational Invariant Techniques) or to perform compression sensing (ISTA: Iterative Shrinkage Thresholding Algorithm, FISTA: Fast ISTA).

The radio wave propagation environment reproduction system 10 illustrated in FIGS. 1 and 2 makes it possible to operate the reflection direction of the radio waves in the reverberation chamber 30 by always reflecting the radio waves radiated by the transmission device 40 once on the reflection angle change RIS 41. That is, the radio wave propagation environment reproduction system 10 can control the reflection angle change RIS 41 to control the reflection direction of the radio waves, and control the direction of arrival of the radio waves reaching the direction-of-arrival estimation device 44.

The radio wave propagation environment reproduction system 10 controls the reflection direction of the reflection angle change RIS 41 while changing the installation angle of the reflection angle change RIS 41, and the direction-of-arrival estimation device 44 estimates the direction of arrival of the radio waves and outputs the estimated direction of arrival to the control server 20.

The control server 20 sets the installation angle of the reflection angle change RIS 41 capable of reproducing a desired propagation channel on the basis of the direction of arrival of the radio waves estimated by the direction-of-arrival estimation device 44, and controls the reflection direction of the reflection angle change RIS 41.

Figure 3:
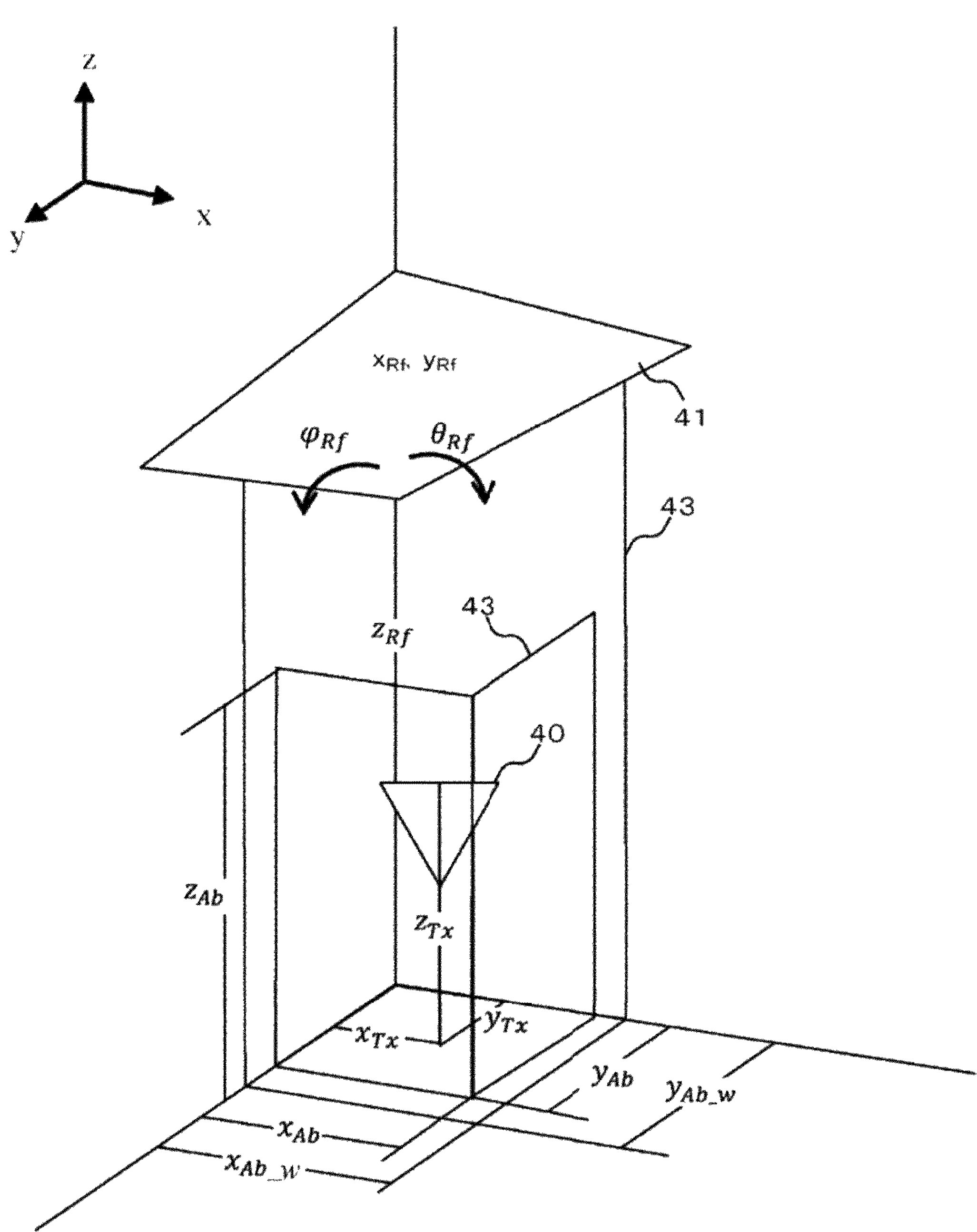
FIG. 3 is a diagram illustrating an installation example of a transmission device, radio wave absorbers, and a reflection angle change RIS.

Next, the periphery of the transmission device 40 in the reverberation chamber 30 will be described in detail. FIG. 3 is a diagram illustrating an installation example of the transmission device 40 (an antenna included in the transmission device 40), the radio wave absorbers 43, and the reflection angle change RIS 41.

For example, in the radio wave propagation environment reproduction system 10, the antenna position ($x_{Tx}$, $y_{Tx}$, $z_{Tx}$) of the transmission device 40, the size ($x_{Ab}$, $y_{Ab}$, $z_{Ab}$) of the radio wave absorber 43, the size ($x_{Rf}$, $y_{Rf}$) of the reflection angle change RIS 41, the position ($z_{Rf}$) of the reflection angle change RIS 41, and the angle ($\theta_{Rf}$, $\varphi_{Rf}$) of the reflection angle change RIS 41 are set. Furthermore, in the radio wave propagation environment reproduction system 10, the size ($x_{Ab\_w}$, $y_{Ab\_w}$) of the radio wave absorber 43 on the wall side is set, and the directivity of the antenna of the transmission device 40 is adjusted.

The reflection angle change RIS 41 is in close contact with each inner wall of the reverberation chamber 30 without gaps. Furthermore, the radio wave absorbers 43 surround, for example, the four sides and the bottom surface of the antenna of the transmission device 40. In addition, the radio wave absorber 43 on the inner wall side of the reverberation chamber 30 has a height to the reflection angle change RIS 41, and is wider than the radio wave absorber 43 on the inner side.

Figure 4A:
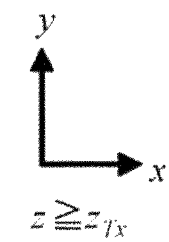
FIG. 4(*a*) is a diagram of the reflection angle change RIS when viewed from a height of an antenna of the transmission device.
Figure 4A:
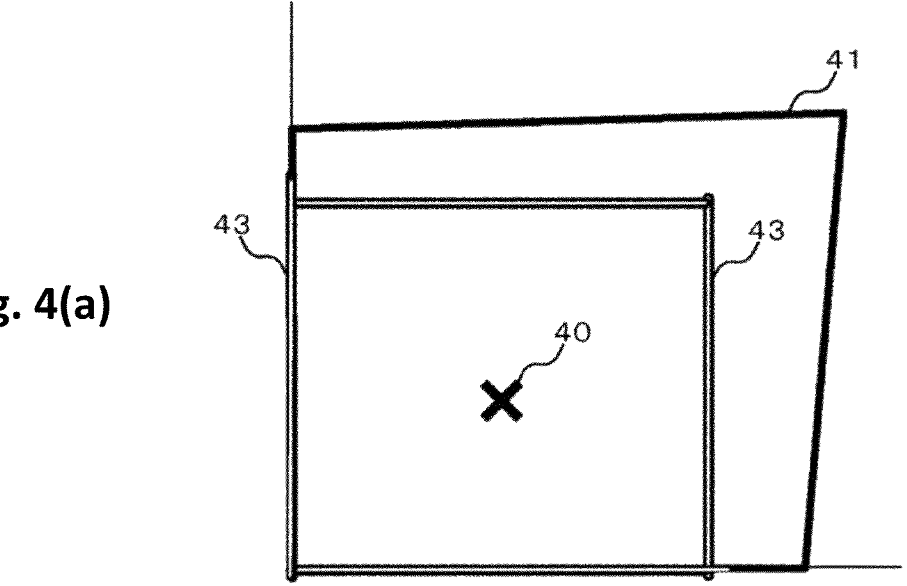
Figure 4B:
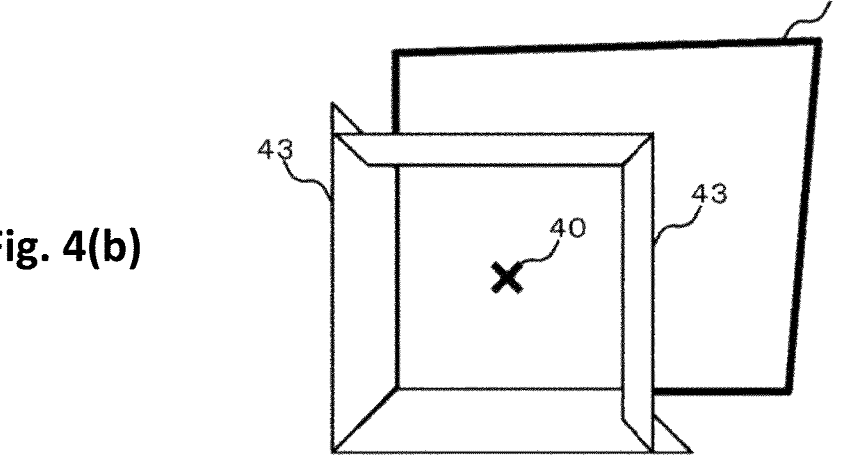

FIG. 4 is a set of diagrams illustrating a state in which the reflection angle change RIS 41 is viewed from the height of the antenna of the transmission device 40. FIG. 4(*a*) is a diagram of the reflection angle change RIS 41 when viewed from the height of the antenna of the transmission device 40. FIG. 4(*b*) is a diagram illustrating an actual appearance in a case where the reflection angle change RIS 41 is viewed from the height of the antenna of the transmission device 40.

The reflection angle change RIS 41 is disposed to occupy the entire range surrounded by the radio wave absorber 43 when viewed from the height of the antenna of the transmission device 40 in order to reflect all the radio waves radiated by the transmission device 40.

Figure 5B:
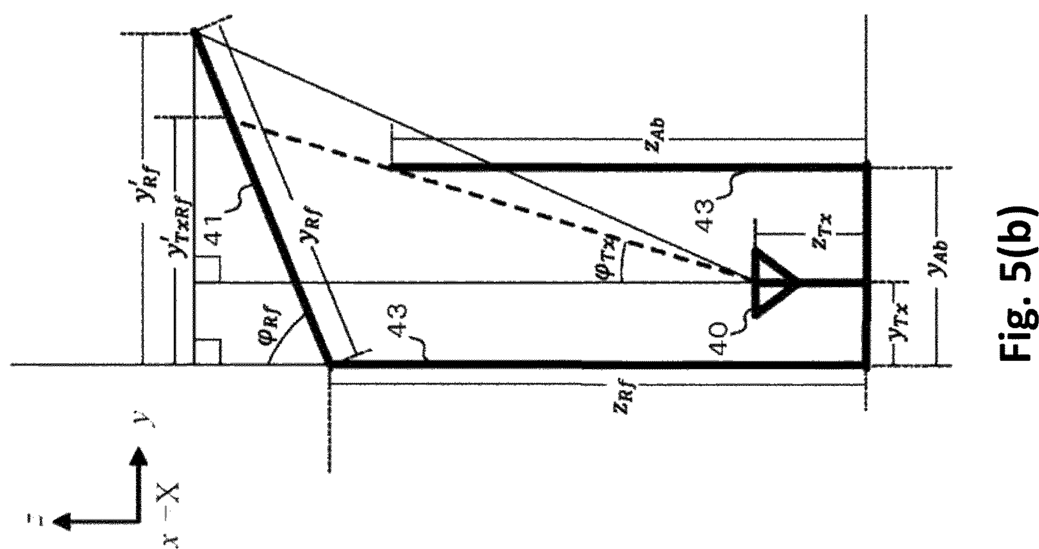
FIG. 5(*a*) is a diagram of the transmission device, the radio wave absorbers, and the reflection angle change RIS when viewed in a y direction.
Figure 5A:
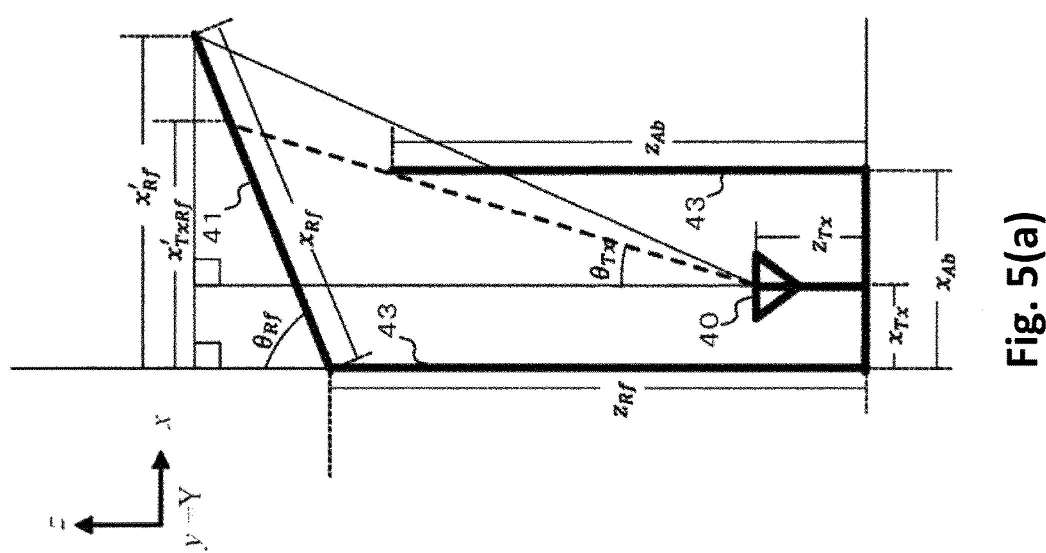

FIG. 5 is a set of diagrams illustrating an installation example of the transmission device 40 (an antenna included in the transmission device 40), the radio wave absorbers 43, and the reflection angle change RIS 41 from the side. FIG. 5(*a*) is a diagram of the transmission device 40, the radio wave absorbers 43, and the reflection angle change RIS 41 when viewed in the y direction. FIG. 5(*b*) is a diagram of the transmission device 40, the radio wave absorbers 43, and the reflection angle change RIS 41 when viewed in the x direction.

Here, the disposition is set to satisfy the following conditions.

<Condition>

In all Y of y=Y ($0 \le Y \le y_{Ab}$) on the x-z plane and in all X of x=X ($0 \le X \le x_{Ab}$) on the y-z plane, $x'_{TxRf} \le x'_{Rf}$ and $y'_{TxRf} \le y'_{Rf}$ are satisfied.

Further, the antenna position ($x_{Tx}$, $y_{Tx}$, $z_{Tx}$) of the transmission device 40, the size ($x_{Ab}$, $y_{Ab}$, $z_{Ab}$) of the radio wave absorber 43, the size ($x_{Rf}$, $y_{Rf}$) of the reflection angle change RIS 41, the position ($z_{Rf}$) of the reflection angle change RIS 41, and the angle ($\theta_{Rf}$, $\varphi_{Rf}$) of the reflection angle change RIS 41 are set.

Figure 6:
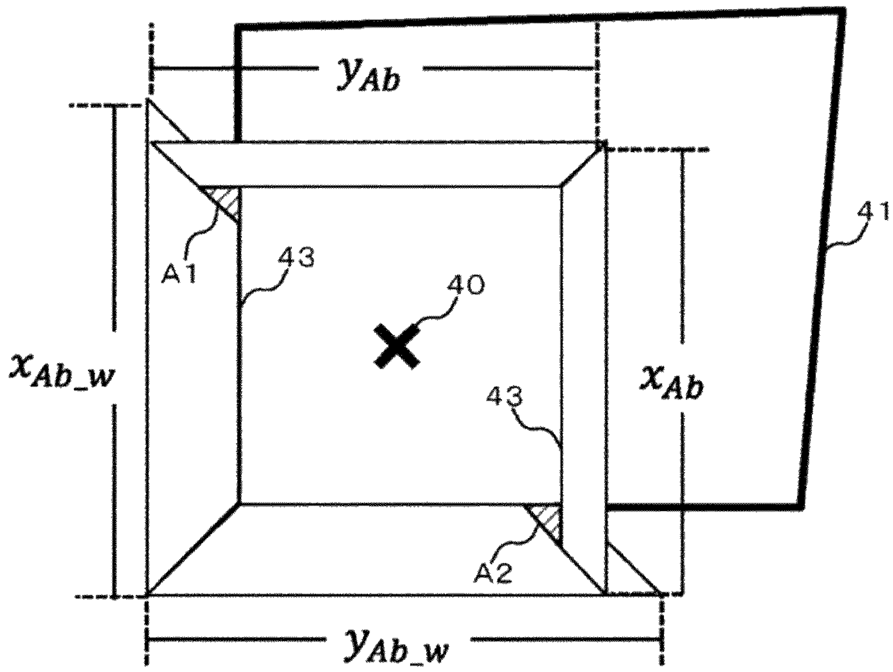
FIG. 6 is a diagram illustrating sizes of the radio wave absorbers.

FIG. 6 is a diagram illustrating sizes of the radio wave absorbers 43. In this case, the size ($x_{Ab}$, $y_{Ab}$, $z_{Ab}$) of the radio wave absorbers 43 on the wall side of the reverberation chamber 30 is set, and $$x_{Ab\_w} = x_{Ab}$$

$$y_{Ab\_w} = y_{Ab}$$

in a case where the above equations are satisfied, gaps A1 and A2 generated between the radio wave absorbers 43 and the reflection angle change RIS 41 are filled.

Figure 7B:
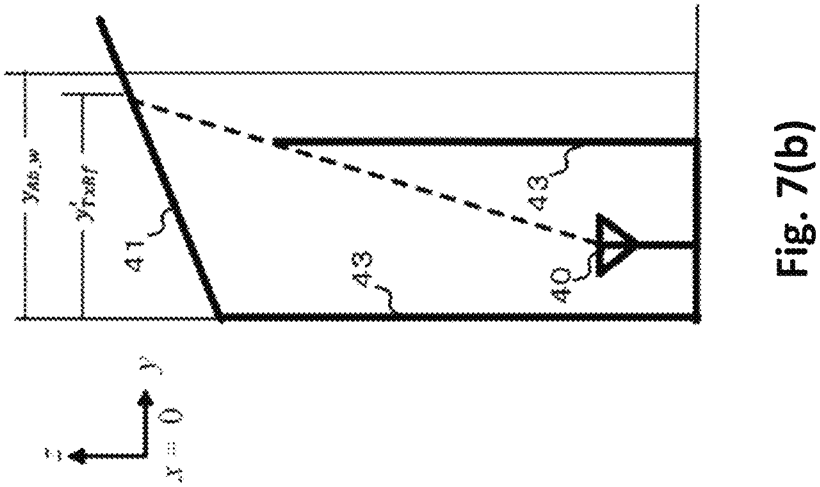
FIG. 7(*a*) is a diagram illustrating a positional relationship between a range of radio waves radiated by the transmission device and the radio wave absorbers and the reflection angle change RIS in the y direction.
Figure 7A:
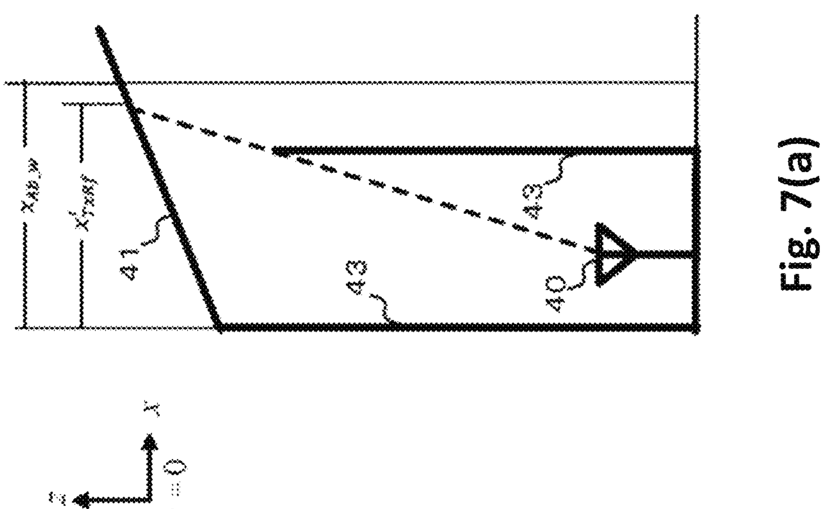

FIG. 7 is a set of diagrams illustrating a positional relationship between the range of the radio waves radiated by the transmission device 40 and the radio wave absorbers 43 and the reflection angle change RIS 41. FIG. 7(*a*) is a diagram illustrating a positional relationship between a range of radio waves radiated by the transmission device 40 and the radio wave absorbers 43 and the reflection angle change RIS 41 in the y direction. Specifically, the size $x_{Ab\_w}$ of the radio wave absorber 43 installed on the x-z plane (wall) when y=0 is illustrated. FIG. 7(*b*) is a diagram illustrating a positional relationship between the range of radio waves radiated by the transmission device 40 and the radio wave absorbers 43 and the reflection angle change RIS 41 in the x direction. Specifically, the size $y_{Ab\_w}$ of the radio wave absorber 43 installed on the y-z plane (wall) when x=0 is illustrated.

As indicated by a thick broken line in FIG. 7, the radio waves radiated by the transmission device 40 reach the reflection angle change RIS 41 in a range to a straight line passing through the edge of the radio wave absorber 43.

Figure 8B:
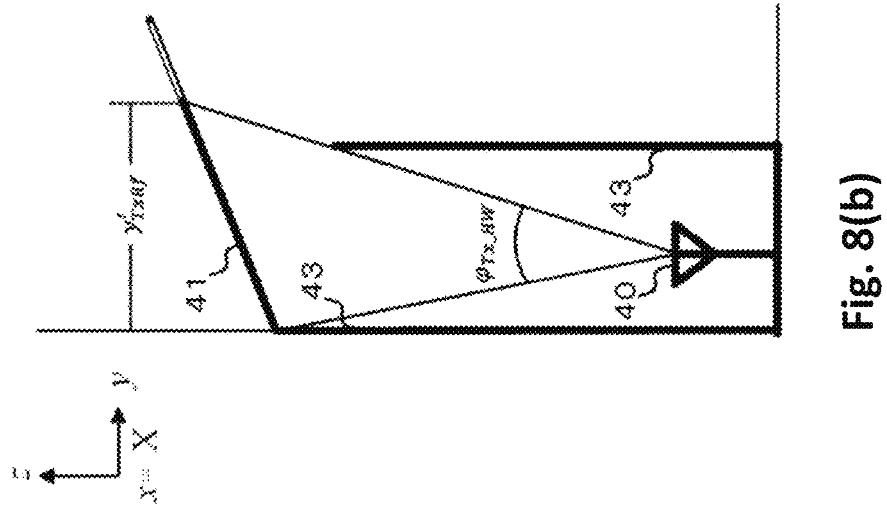
FIG. 8(*a*) is a diagram illustrating a half-value angle of radio waves radiated by the transmission device when viewed in the y direction.
Figure 8A:
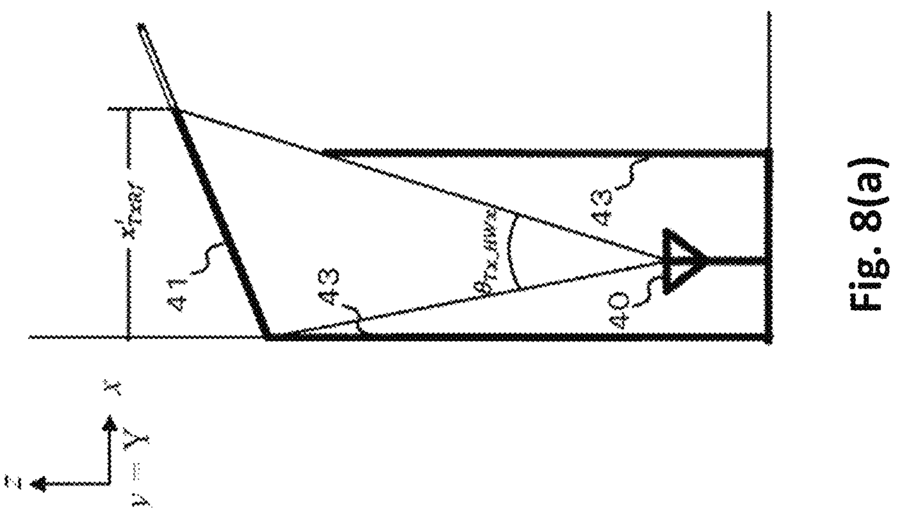

FIG. 8 is a set of diagrams illustrating a half-value angle of radio waves radiated by the transmission device 40. FIG. 8(*a*) is a diagram illustrating a half-value angle of radio waves radiated by the transmission device 40 when viewed in the y direction. FIG. 8(*b*) is a diagram illustrating a half-value angle of radio waves radiated by the transmission device 40 when viewed in the x direction.

In the antenna of the transmission device 40, as illustrated in FIG. 8, the range of the radio waves reaching the reflection angle change RIS 41 desirably matches the half-value angle of the directivity of the antenna as in the following condition.

<Condition>

For example, in order to improve energy efficiency in all Y of y=Y ($0 \le x \le y_{Ab}$) on the x-z plane and in all X of x=X ($0 \le X \le x_{Ab}$) on the y-z plane, ideally, the angles $\theta_{Tx\_HW}$ and $\varphi_{Tx\_HW}$ are desirable such that the line-of-sight range from the antenna of the transmission device 40 to the reflection angle change RIS 41 matches the half width of the directivity.

Figure 9:
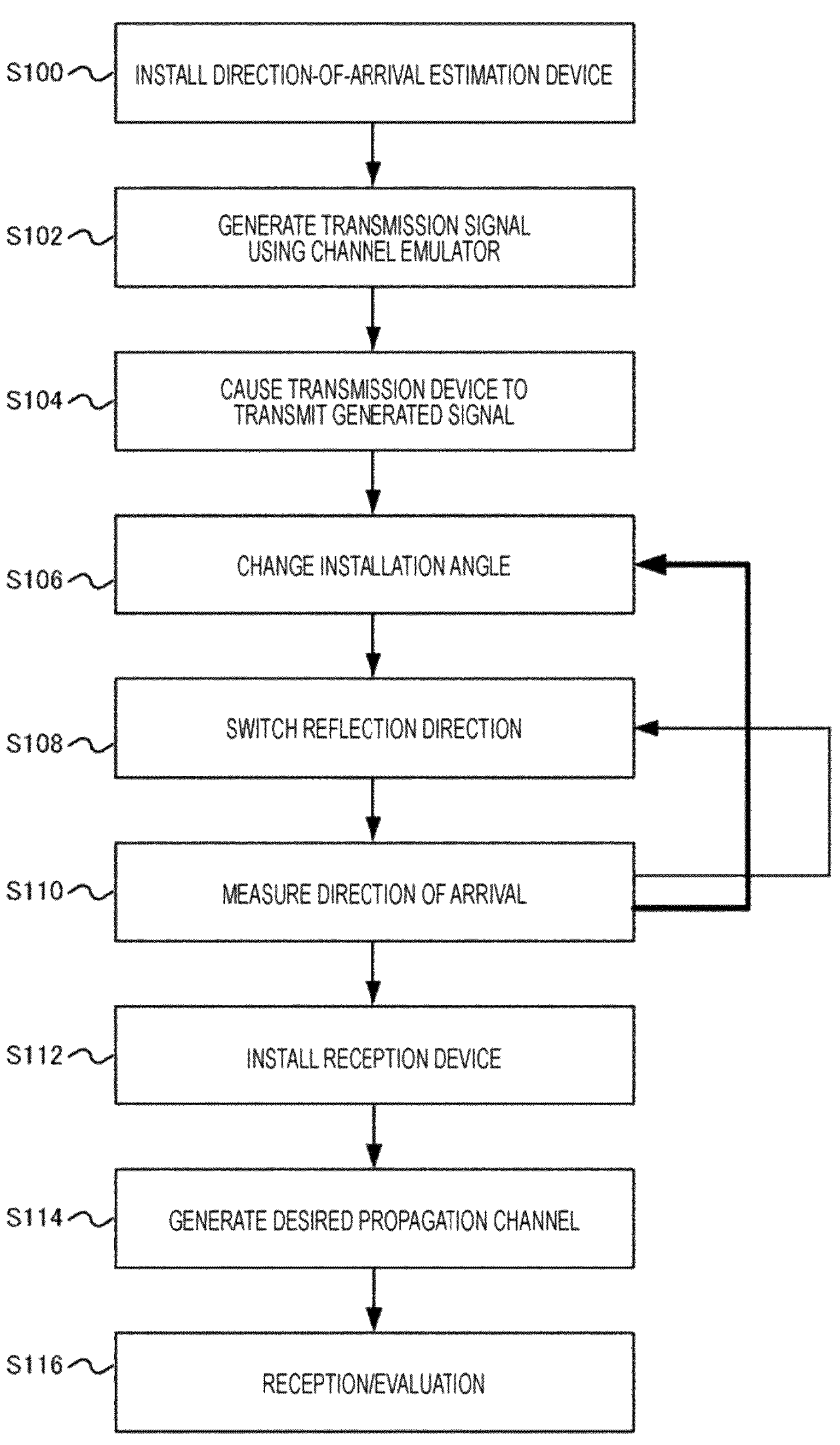
FIG. 9 is a diagram sequentially illustrating processing performed by the radio wave propagation environment reproduction system.

Next, processing performed by the radio wave propagation environment reproduction system 10 will be described. FIG. 9 is a diagram sequentially illustrating processing performed by the radio wave propagation environment reproduction system 10. As illustrated in FIG. 9, an operator installs the direction-of-arrival estimation device 44 at a predetermined position on the placing table 42 in the reverberation chamber 30 (S100).

The control server 20 generates a transmission signal using the channel emulator 22 (S102), and causes the transmission device 40 to transmit the generated signal (S104).

The installation angle control device 21 changes the installation angle of the reflection angle change RIS 41 (S106). The reflection angle control device 23 switches the direction in which the reflection angle change RIS 41 reflects radio waves (S108).

Next, the direction-of-arrival estimation device 44 measures (estimates) the direction of arrival of the radio waves, and outputs the estimation result to the control server 20 (S110).

Then, the control server 20 performs control to repeat the processing of S108 and S110 until the reflection angle change RIS 41 changes the reflection direction and the direction-of-arrival estimation device 44 estimates the direction of arrival in the entire range of the direction of arrival of the radio waves at the predetermined position.

In addition, the control server 20 repeats the processing such that the processing of S106 to S110 is executed in all ranges (all angles of the movable range) that can be set for the reflection angle change RIS 41.

Thereafter, the operator installs a reception device to be measured at the position where the direction-of-arrival estimation device 44 has been installed (S112). That is, the direction-of-arrival estimation device 44 is replaced with a reception device.

The control server 20 controls the installation angle control device 21 and the reflection angle control device 23 to control the installation angle and the reflection direction of the reflection angle change RIS 41, and generates a desired propagation channel from the transmission device 40 (S114). That is, the radio wave propagation environment reproduction system 10 reproduces the radio wave propagation environment.

The reception device that replaces the direction-of-arrival estimation device 44 receives radio waves. Then, for example, the control server 20 evaluates propagation characteristics or the like of the radio waves received by the reception device (S116).

In this way, the radio wave propagation environment reproduction system 10 can reproduce not only an isotropic propagation channel but also a more complicated propagation channel such as a case where radio waves arrive only from a certain direction by changing the installation angle and the reflection direction of the reflection angle change RIS 41.

Next, a second embodiment of a radio wave propagation environment reproduction system will be described with reference to the drawings. First, an outline of a radio wave propagation environment reproduction system 10*a* according to the second embodiment will be described with reference to FIGS. 10 and 11.

Figure 11:
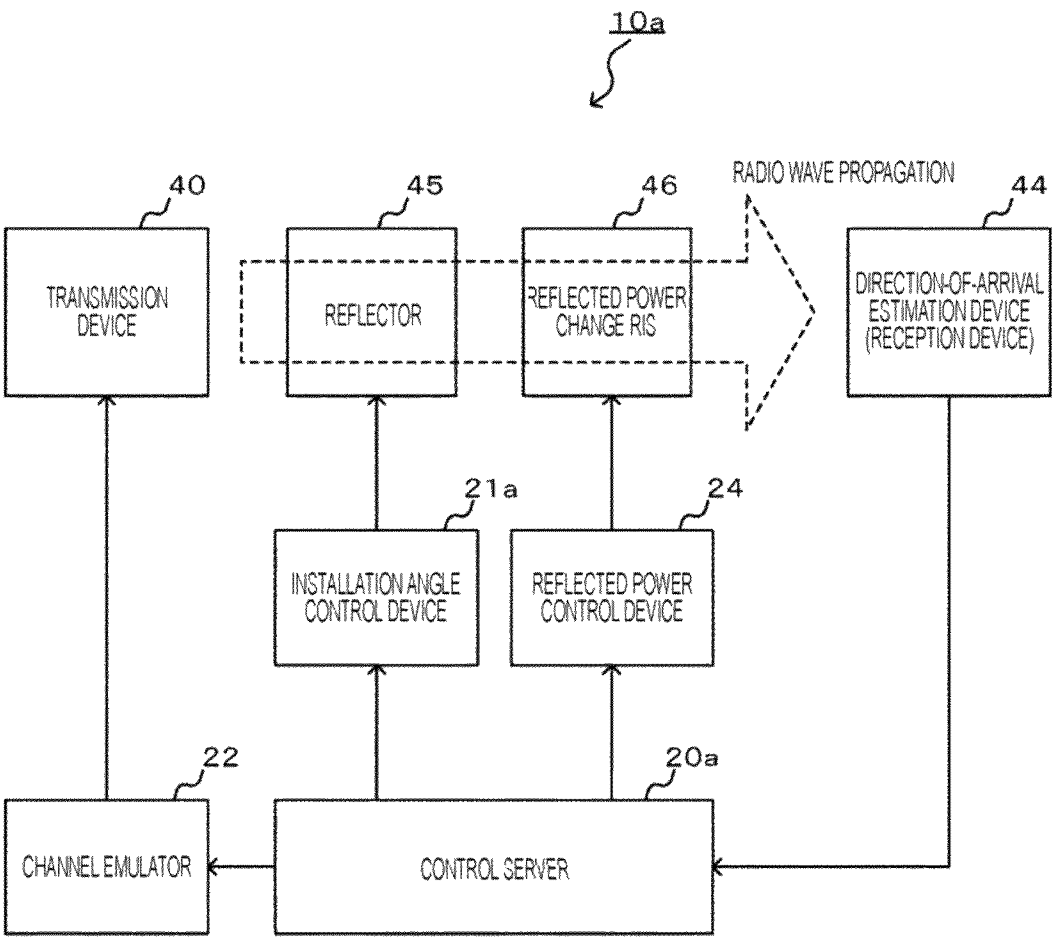
FIG. 11 is a diagram illustrating an outline of functions of the radio wave propagation environment reproduction system according to the second embodiment.

FIG. 10 is a diagram illustrating an outline of a configuration of the radio wave propagation environment reproduction system 10*a* according to the second embodiment. FIG. 11 is a diagram illustrating an outline of functions of the radio wave propagation environment reproduction system 10*a* according to the second embodiment.

The radio wave propagation environment reproduction system 10*a* includes a control server 20*a*, an installation angle control device 21*a*, a channel emulator 22, a reflected power control device 24, and a reverberation chamber 30*a*. Hereinafter, substantially the same components as those of the radio wave propagation environment reproduction system 10 illustrated in FIG. 1 are denoted by the same reference numerals.

In the reverberation chamber 30*a*, a transmission device 40, a placing table 42, a radio wave absorber 43, a reflector 45, a plurality of reflected power change RISs 46, and a direction-of-arrival estimation device 44 are provided.

The control server 20*a* has a function as a computer, and controls each unit constituting the radio wave propagation environment reproduction system 10*a*. For example, the control server 20*a* controls the installation angle control device 21*a*, the channel emulator 22, and the reflected power control device 24 on the basis of the direction of arrival of the radio waves estimated by the direction-of-arrival estimation device 44.

The installation angle control device 21*a* controls the installation angle of the reflector 45 by outputting a control signal to the reflector 45.

The channel emulator 22 generates a transmission signal corresponding to a predetermined propagation channel under the control of the control server 20*a*, and outputs the transmission signal to the transmission device 40.

The reflected power control device 24 controls the power of the radio waves reflected by the reflected power change RIS 46 by outputting a control signal to the reflected power change RIS 46.

The transmission device 40 includes an antenna in which a half-value angle indicating directivity matches a line-of-sight range for the reflector 45.

The reflector 45 reflects (primarily reflects) the radio waves transmitted by the transmission device 40. The positional relationship between the reflector 45 and the transmission device 40 is similar to the positional relationship between the reflection angle change RIS 41 and the transmission device 40 described above.

The reflected power change RIS 46 changes the radio waves reflected by the reflector 45 into power according to the control signal and reflects the power. For example, the reflected power change RIS 46 changes the magnitude of the reflected power or turns off the reflected power (OFF) according to the control signal. The plurality of reflected power change RISs 46 are laid on, for example, the inner wall, the floor, the ceiling, and the like in the reverberation chamber 30*a*.

Then, the direction-of-arrival estimation device 44 estimates the direction of arrival of the radio waves reflected by the reflected power change RIS 46 at a predetermined position in the reverberation chamber 30*a*, and outputs the estimation result to the reverberation chamber 30*a*.

The radio wave propagation environment reproduction system 10*a* illustrated in FIGS. 10 and 11 makes it possible to operate the reflection direction of the radio waves in the reverberation chamber 30*a* by always reflecting the radio waves radiated by the transmission device 40 once on the reflector 45 (primary reflector). That is, the radio wave propagation environment reproduction system 10*a* can control the installation angle of the reflector 45 and the reflected power of the reflected power change RIS 46 to control the reflection direction of the radio waves and control the direction of arrival and power of the radio waves reaching the direction-of-arrival estimation device 44.

The radio wave propagation environment reproduction system 10*a* sequentially switches ON/OFF of the reflected power change RIS 46 while changing the angle of the reflector 45, and the direction-of-arrival estimation device 44 estimates the direction of arrival of the radio waves and which reflected power change RIS 46 reflects the radio waves, and outputs the estimation result to the control server 20*a*.

The control server 20*a* controls the installation angle of the reflector 45 and the reflected power of each of the reflected power change RISs 46 such that a desired propagation channel can be reproduced on the basis of the direction of arrival of the radio waves estimated by the direction-of-arrival estimation device 44.

Figure 12:
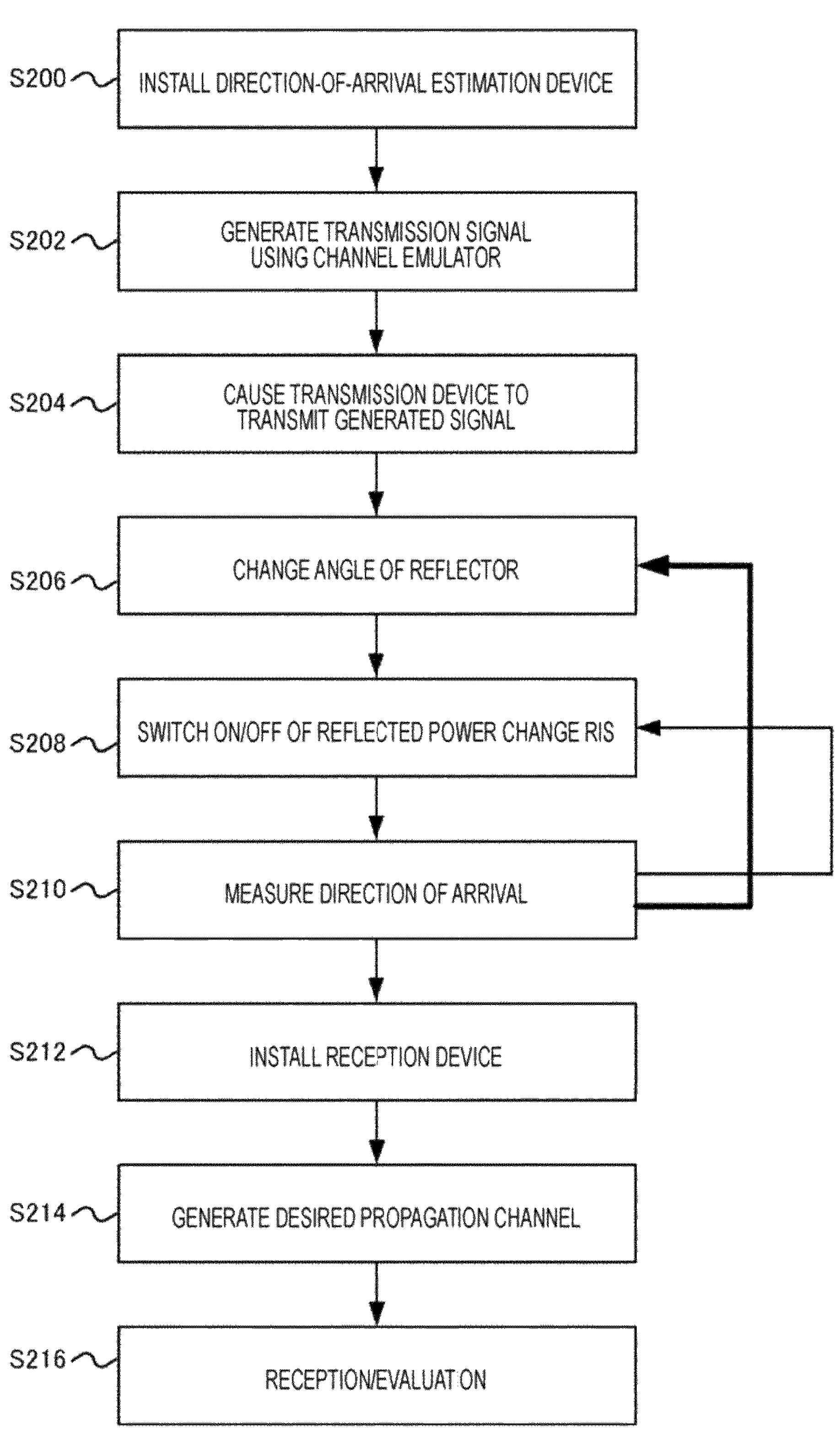
FIG. 12 is a diagram sequentially illustrating processing performed by the radio wave propagation environment reproduction system.

Next, processing performed by the radio wave propagation environment reproduction system 10*a* will be described. FIG. 12 is a diagram sequentially illustrating processing performed by the radio wave propagation environment reproduction system 10*a*. As illustrated in FIG. 12, an operator installs the direction-of-arrival estimation device 44 at a predetermined position on the placing table 42 in the reverberation chamber 30*a* (S200). The control server 20*a* generates a transmission signal using the channel emulator 22 (S202), and causes the transmission device 40 to transmit the generated signal (S204).

The installation angle control device 21*a* changes the installation angle of the reflector 45 (S206). The reflected power control device 24 controls power with which each of the reflected power change RISs 46 reflects radio waves. For example, the reflected power control device 24 switches ON/OFF of each reflected power change RIS 46 (S208).

Next, the direction-of-arrival estimation device 44 measures (estimates) the direction of arrival of the radio waves, and outputs the estimation result to the control server 20*a* (S210).

Then, the control server 20*a* performs control to repeat the processing of S208 and S210 until the reflector 45 and each of the reflected power change RISs 46 change the reflection direction and the direction-of-arrival estimation device 44 estimates the direction of arrival in the entire range of the direction of arrival of the radio waves at the predetermined position.

In addition, the control server 20*a* repeats the processing such that the processing of S206 to S210 is executed in all ranges (all angles of the movable range) that can be set for the reflector 45.

Thereafter, the operator installs a reception device to be measured at the position where the direction-of-arrival estimation device 44 has been installed (S212). That is, the direction-of-arrival estimation device 44 is replaced with a reception device.

The control server 20*a* controls the installation angle control device 21*a* and the reflected power control device 24 to control the installation angle of the reflector 45 and the reflected power of each of the reflected power change RISs 46, and generates a desired propagation channel from the transmission device 40 (S214). That is, the radio wave propagation environment reproduction system 10*a* reproduces the radio wave propagation environment.

The reception device that replaces the direction-of-arrival estimation device 44 receives radio waves. Then, for example, the control server 20*a* evaluates propagation characteristics or the like of the radio waves received by the reception device (S216).

In this way, the radio wave propagation environment reproduction system 10*a* can easily reproduce a more complicated propagation channel such as a case where radio waves arrive only from a certain direction by changing the installation angle of the reflector 45 and the reflected power of each of the reflected power change RISs 46.

Note that some or all of the functions of the radio wave propagation environment reproduction system 10 and the radio wave propagation environment reproduction system 10*a* may be configured by hardware such as a programmable logic device (PLD) or a field programmable gate array (FPGA), or may be configured as a program executed by a processor such as a CPU.

For example, the control server 20 and the control server 20*a* can be implemented by using a computer and a program, and the program can be recorded in a storage medium or provided through a network.

REFERENCE SIGNS LIST

10, 10*a* Radio wave propagation environment reproduction system
20, 20*a* Control server
21, 21*a* Installation angle control device
22 Channel emulator
23 Reflection angle control device
24 Reflected power control device
30, 30*a* Reverberation chamber
40 Transmission device
41 Reflection angle change RIS
42 Placing table
43 Radio wave absorber
44 Direction-of-arrival estimation device
45 Reflector
46 Reflected power change RIS

The invention claimed is:

1. A radio wave propagation environment reproduction system comprising:

a transmitter to transmit radio waves in a predetermined direction in a reverberation chamber;

a reflection angle change RIS to reflect the radio waves transmitted by the transmitter at an angle according to a control signal;

an installation angle controller to control an installation angle of the reflection angle change RIS by outputting a control signal to the reflection angle change RIS;

a reflection angle controller to control a reflection angle of the radio waves by the reflection angle change RIS by outputting a control signal to the reflection angle change RIS;

a direction-of-arrival estimator to estimate a direction of arrival of the radio waves reflected by the reflection angle change RIS at a predetermined position in the reverberation chamber; and a control server to control the installation angle controller and the reflection angle controller on the basis of the direction of arrival of the radio waves estimated by the direction-of-arrival estimator.

2. The radio wave propagation environment reproduction system according to claim 1, wherein the transmitter includes an antenna in which a half-value angle indicating directivity matches a line-of-sight range for the reflection angle change RIS.

3. A radio wave propagation environment reproduction system comprising:

a transmitter to transmit radio waves in a predetermined direction in a reverberation chamber;

a reflector to reflect the radio waves transmitted by the transmitter;

an installation angle controller to control an installation angle of the reflector by outputting a control signal to the reflector;

a reflected power change RIS to change the radio waves reflected by the reflector to power according to a control signal and reflects the power;

a reflected power controller to control the power of the radio waves reflected by the reflected power change RIS by outputting a control signal to the reflected power change RIS;

a direction-of-arrival estimator to estimate a direction of arrival of the radio waves reflected by the reflected power change RIS at a predetermined position in the reverberation chamber; and a control server to control the installation angle controller and the reflected power controller on the basis of the direction of arrival of the radio waves estimated by the direction-of-arrival estimator.

4. The radio wave propagation environment reproduction system according to claim 3, wherein the transmitter includes an antenna in which a half-value angle indicating directivity matches a line-of-sight range for the reflector.

5. A radio wave propagation environment reproduction method comprising:

controlling an installation angle of a reflection angle change RIS to reflect radio waves transmitted by a transmitter in a predetermined direction in a reverberation chamber at an angle according to a control signal;

controlling a reflection angle of the radio waves reflected by the reflection angle change RIS according to a control signal;

estimating a direction of arrival of the radio waves reflected by the reflection angle change RIS at a predetermined position in the reverberation chamber; and controlling the installation angle and the reflection angle of the reflection angle change RIS on the basis of the estimated direction of arrival of the radio waves.

6. The radio wave propagation environment reproduction method according to claim 5, wherein the transmitter includes an antenna in which a half-value angle indicating directivity matches a line-of-sight range for the reflection angle change RIS.

* * * * *